United States Patent
Lee et al.

(10) Patent No.: US 7,089,850 B2
(45) Date of Patent: Aug. 15, 2006

(54) FOOD HOLDING CABINET ASSEMBLY

(75) Inventors: Myong J. Lee, Elk River, MN (US); Duane Crisp, Miami, FL (US)

(73) Assignee: Burger King Corporation, Miami, FL (US)

( * ) Notice: Subject to any disclaimer, the term of this patent is extended or adjusted under 35 U.S.C. 154(b) by 573 days.

(21) Appl. No.: 09/875,661

(22) Filed: Jun. 5, 2001

(65) Prior Publication Data

US 2002/0178930 A1 Dec. 5, 2002

(51) Int. Cl.
*A23L 1/00* (2006.01)
*A47J 27/00* (2006.01)
*A47J 37/00* (2006.01)

(52) U.S. Cl. .............. 99/468; 99/476; 99/448; 99/483; 219/386; 219/401

(58) Field of Classification Search ........... 99/325–333, 99/342, 352–355, 467–470, 483, 516, 534; 34/196, 197; 62/520, 419, 457.1; 312/236; 126/20, 33, 369, 369.2, 377; 165/61, 64, 165/265, 267, 918, 919, 48.1; 219/386, 387, 219/478, 480, 506, 521, 400, 401; 426/231–233, 426/506, 408, 529, 510, 523, 511
See application file for complete search history.

(56) References Cited

U.S. PATENT DOCUMENTS

| | | | |
|---|---|---|---|
| 3,895,215 A * | 7/1975 | Gordon | 219/400 |
| 4,103,736 A * | 8/1978 | Colato et al. | 312/236 X |
| 4,110,916 A * | 9/1978 | Bemrose | 99/478 X |
| 4,143,592 A * | 3/1979 | Kuest et al. | 99/483 |
| 4,210,675 A * | 7/1980 | Liebermann | 99/483 X |
| 4,237,623 A * | 12/1980 | Timm et al. | 34/196 |
| 4,587,946 A * | 5/1986 | Doyon et al. | 126/20 |
| 5,069,273 A * | 12/1991 | O'Hearne | 165/919 X |
| 5,086,693 A * | 2/1992 | Tippmann et al. | 99/468 X |
| 5,201,364 A * | 4/1993 | Tippmann et al. | 99/470 X |
| 5,203,258 A * | 4/1993 | Tippmann et al. | 99/483 |
| 5,782,174 A * | 7/1998 | Cohn et al. | 99/476 |
| 6,058,926 A * | 5/2000 | Ruiz | 126/33 |
| 6,323,464 B1 * | 11/2001 | Cohn | 219/401 |

* cited by examiner

*Primary Examiner*—Timothy F. Simone
(74) *Attorney, Agent, or Firm*—Frommer Lawrence & Haug; Matthew K. Ryan, Esq.

(57) ABSTRACT

A holding cabinet assembly for holding pre-processed food products and a process for maintaining the product appearance of a pre-processed food product for a predetermined amount of time includes a steamer assembly and a cabinet housing coupled to the steamer assembly. As a result of controlling and maintaining the temperature of the water in the steamer assembly and air in the food cabinet housing, the relative humidity of the food cabinet housing is maintained at a substantially fixed value. In this holding cabinet assembly, compartments are arranged in the housing with each compartment including an openable and closeable drawer. A carrier insert is adapted to be removably supported in each of the drawers with each carrier insert being capable of holding pre-processed food products whereby the food products in the carrier inserts can be conditioned at the fixed relative humidity of the food cabinet housing.

28 Claims, 2 Drawing Sheets

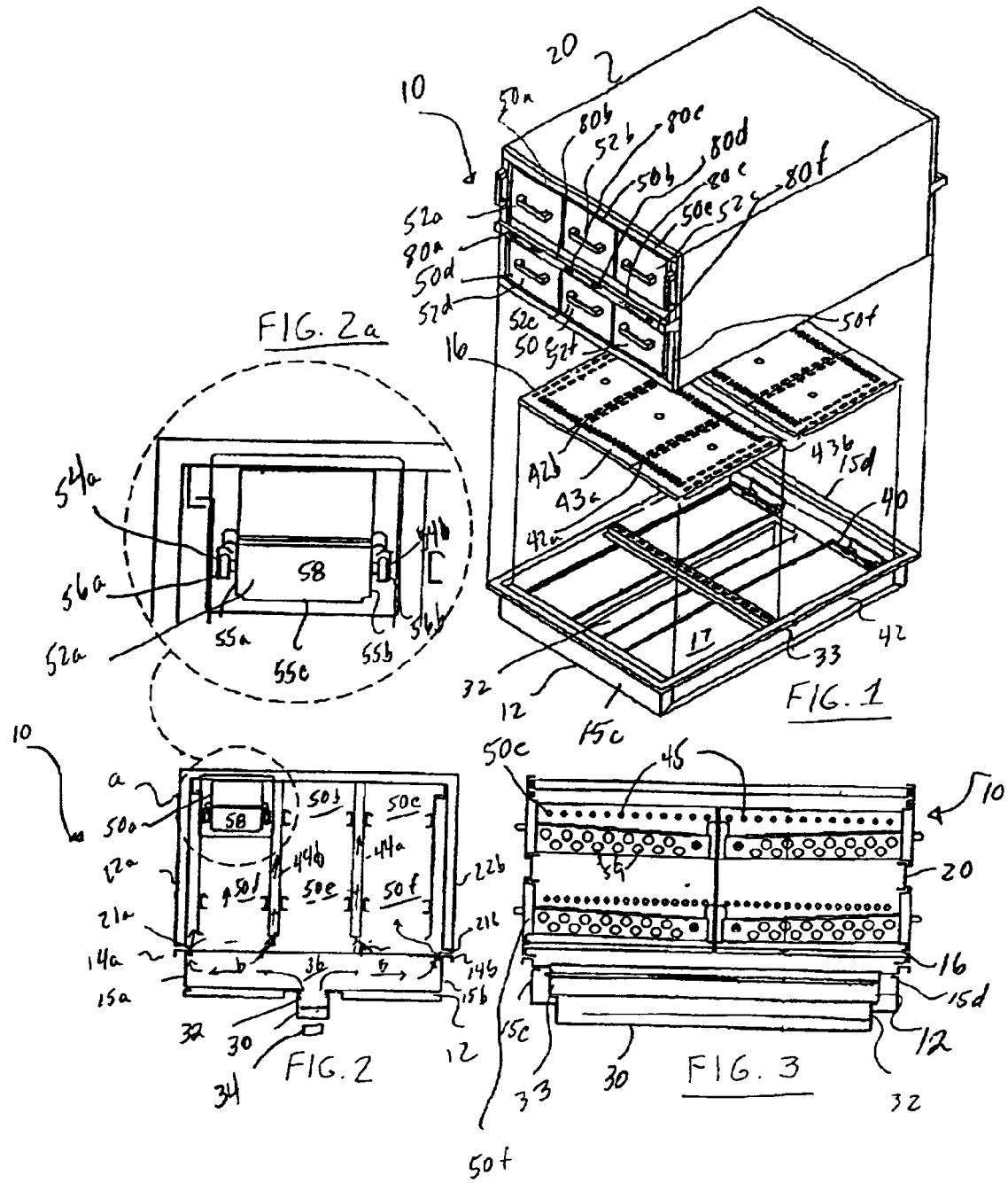

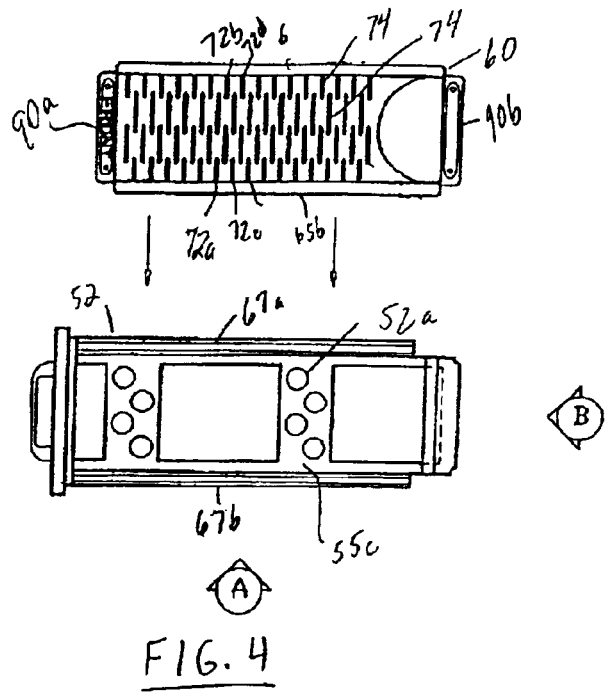
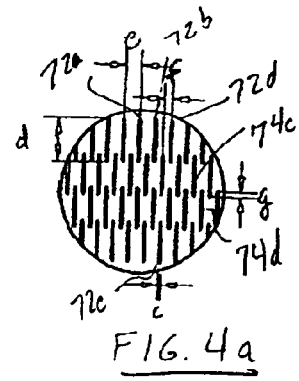
FIG. 4
FIG. 4a
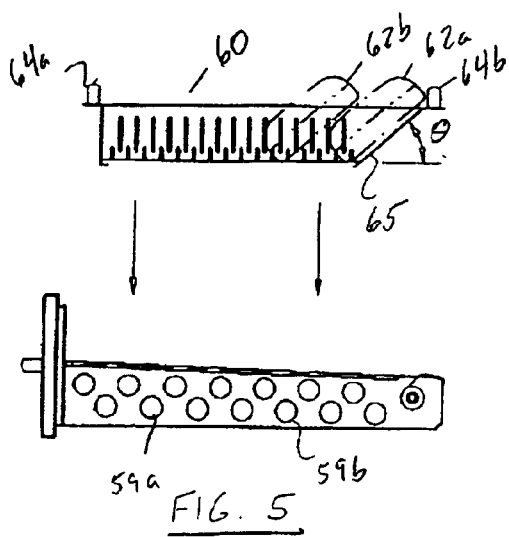
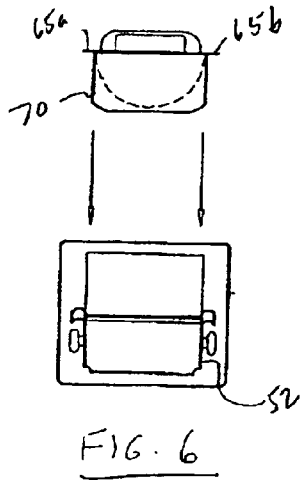
FIG. 5
FIG. 6

FOOD HOLDING CABINET ASSEMBLY

BACKGROUND OF THE INVENTION

A. Field of the Invention

This invention relates to the field of food holding cabinets, and more particularly, relates to the field of holding cabinets for pre-processed food products.

B. Related Art

In a bakery, food holding cabinets have been used wherein fresh baked products are held for a period of time and the air in the cabinet is maintained at ambient temperature and humidity. However, these holding cabinets previously employed in bakeries have been found to be undesirable in a fast food restaurant to hold toasted baked goods as (a) fast food restaurants require that the temperature and humidity of the holding cabinet be maintained other than at ambient temperature and humidity, and (2) the product tends to dry out in these food cabinets used in bakeries thereby leading to degradation of the physical characteristics of the product. Therefore, in fast food restaurants, it has been found desirable to provide a holding cabinet for pre-processed food products, namely toasted baked goods, such as toasted hamburger buns, which controls heat and humidity to maintain product appearance, such as product softness, taste, and the desired toasted characteristics, also known in this context as an acceptable caramelized appearance.

In the fast food industry, it is known to batch toast baked goods. Batch toasting is advantageous in the fast food environment as it is less labor intensive and leads to increased productivity. In one known batch toasting process, the baked food product is removed from a plastic bag and toasted, then the toasted food product is reinserted into the plastic bag and then put in a dry convective heat cabinet.

This batch toasting process has been found to be disadvantageous for a number of reasons. First, an intermediate step is required as the baked food product must be removed from and then reinserted into the plastic bag, thereby leading to a consequent increase in labor. In addition, in this prior batch process, the holding cabinet must be continually opened and closed because of the convective circuit. This, in turn, leads to further labor requirements. It has therefore been found desirable to provide a food holding cabinet assembly for toasted baked goods for use in fast food restaurants which does not require utilization of a convection cabinet. It has been further found desirable to provide a food holding cabinet assembly for toasted baked goods for use in a fast food restaurant which is easy to use.

As a further prior example, in order to attempt to maintain the desired physical characteristics of toasted baked products in fast food restaurants, the toasted baked products have been placed in holding steamers or convective ovens. However, these prior steamers and convective ovens have been unable to control humidity. Moreover, since these steamers and ovens typically have relatively large sliding or hinged doors to load the toasted food products thereinto and remove the toasted food products therefrom, heat and humidity escape from the unit. In addition, these prior steamers used in fast food restaurants have limited holding times only, up to approximately 10 minutes, and limited capacities, as one example, up to 16 hamburger buns of a 4" diameter and 12 hamburger buns of a 5" diameter. It has therefore been found desirable to provide a food holding cabinet assembly for toasted baked good for use in a fast food restaurant which provides for increased holding times and product capacities.

OBJECTS OF THE INVENTION

Therefore, it is an object of the invention to provide a food holding cabinet assembly for pre-processed food products for use in a fast food restaurant which avoids the aforementioned deficiencies of the prior art.

It is also an object of this invention to provide a food holding cabinet assembly for pre-processed food products, such as toasted hamburger buns, which controls heat and humidity to maintain the product appearance and desired characteristics of the pre-processed food product.

It is another object of this invention to provide a food holding cabinet assembly for pre-processed food products for use in a fast food restaurant which does not require any intermediate process step.

It is further object of this invention to provide a food holding cabinet assembly for pre-processed food products for use in a fast food restaurant which does not utilize a convective heater in the food cabinet.

It is yet another object of this invention to provide a food holding cabinet assembly for pre-processed food products for use in a fast food restaurant which is easy to use and reduces labor costs.

It is still another object of this invention to provide a food holding cabinet assembly for pre-processed food products which increases the holding time for maintaining the desired product appearance and increases product capacity within the food holding cabinet assembly.

It is yet another object of this invention to provide a food holding cabinet assembly for pre-processed food products which has a compartmentalized design for thermal efficiencies.

It is still a further object of this invention to provide a food holding cabinet assembly for pre-processed food products for which only exposes a small portion of the stored food products to external conditions when the pre-processed food products are inserted into or are removed from the food cabinet.

It is also a further object of this invention to provide a food holding cabinet assembly for pre-processed food products which has the ability to separate different types of food products for operational ease.

It is yet still a further object of this invention to provide a process for maintaining the desired product appearance of a pre-processed food product in a food cabinet housing assembly while increasing the holding time of the food product in the food cabinet.

Various other objects, advantages and features of the present invention will become readily apparent from the ensuing detailed description and the novel features will be particularly pointed out in the appended claims.

SUMMARY OF THE INVENTION

This invention relates to a food holding cabinet assembly for pre-processed food products which controls heat and humidity therein to maintain product appearance and desired attributes of the pre-processed food products. In addition, the present invention relates to a process for maintaining the product appearance of a pre-processed food product for a predetermined amount of time in a food holding cabinet assembly. In accordance with the general objects set forth above, the food holding cabinet assembly of this invention does not require any intermediate process step (such as repackaging of the food products) and does not require use of a convective heater in the food cabinet.

The food holding cabinet assembly of this invention includes a steamer assembly including a water reservoir and a cabinet housing coupled to the steamer assembly having air circulated therein. In addition, a air baffle plate separates the steamer assembly and the food cabinet housing and includes a plurality of air openings therein which allows air to pass from the steam assembly into the food cabinet housing. A first heat source heats water in a water reservoir and maintains the water in the water reservoir at a first substantially constant temperature. A second heat source heats air passing through the cabinet housing and maintains the air passing through the cabinet housing at a second substantially constant temperature. As a result, the cabinet housing is maintained at a substantially constant relative humidity.

A plurality of compartments are arranged in the cabinet housing with each compartment having an openable and closable drawer. In accordance with one of the general objects of the present invention, the food cabinet herein does not expose any of remaining pre-processed food products contained therein to the external environment when pre-processed food products are removed from a drawer or inserted thereinto. More specifically, each of the drawers of the food holding cabinet can be independently opened irrespective of the remaining closed drawers so that the pre-processed food product in the closed drawers are not influenced by external conditions.

In this food holding cabinet assembly, a carrier insert is adapted to be removably supported in each of the drawers with each of the carrier inserts being capable of holding a plurality of the pre-processed food products therein. In one preferred embodiment, these carrier inserts are capable of holding up to 10 hamburger buns of a 4" diameter and 7 hamburger buns of 5" diameter. Therefore, if the food housing cabinet includes 12 such compartments, the food holding cabinet can accommodate an increased bun capacity of between 84 to 120 hamburger buns depending upon the diameter of the buns. When the carrier inserts are removably supported on the drawers and the drawers are closed so that the pre-processed food products are contained within the compartments of the food holding cabinet, the pre-processed food products are conditioned at the substantially fixed relative humidity of the food cabinet so as to maintain the product appearance of the conditioned food products.

Each of the carrier inserts also promotes the drainage of moisture from the pre-processed food product supported therein as well as promotes air flow around the contained food products. In order to accomplish these advantageous results, each of the carrier inserts includes a plurality of rows of open slits provided on the surfaces of each of the carrier inserts supporting the pre-processed food products. In order to provide better air flow characteristics, adjacent rows of the plurality of rows of open slits are substantially offset from one another and alternate rows of the plurality of rows of open slits are substantially aligned with one another.

In order to distribute the weight of the pre-processed food products supported in the carrier inserts so as to reduce the chances of undesirable imprints on the food products, the carrier inserts include an angled rear wall. As a result, each food product in the carrier insert leans against the adjacent food product in the carrier insert so that weight is removed from the bottom of the food product. Consequently, weight is more evenly distributed throughout the food product. This angled wall also provides for operational ease because as each food product is removed from the carrier insert, the angled stack of remaining food products does not fall.

Therefore, by employing the compartmentalized design of the present invention which includes independently openable/closable drawers as well carrier inserts supporting food products therein, thermal efficiencies and weight distribution advantages are achieved.

In addition, control indicators are provided in the food holding cabinet assembly of this invention which control the sequencing of removal of the pre-processed food products from each compartment before expiration of a predetermined amount of time. In the preferred embodiment, the pre-processed food products, such as toasted hamburger buns, can be stored in the food holding cabinet of this invention and retain an acceptable product appearance for up to approximately 90 minutes. These control indicators include colored light indicators which signal the sequencing of removal of the pre-processed food products from the compartment before expiration of the acceptable time limit. In particular, each compartment of the food holding cabinet has associated therewith a red-light, yellow-light, green-light quality control timer which indicates the acceptability of product in that compartment.

As a result of this invention, the temperature and humidity in the food cabinet housing are easily controlled so as to maintain product appearance and the products desired attributes, such as the caramelized appearance of a toasted hamburger bun. Moreover, this food holding cabinet assemble leads to a reduced labor costs, increases acceptable holding times and increases product capacity.

BRIEF DESCRIPTION OF THE DRAWINGS

The following detailed description given by way of example, but not intended to limit the invention solely to the specific embodiments described, may best be understood in conjunction with the accompanying drawings in which:

FIG. 1 is an exploded perspective view of a preferred embodiment of a food holding cabinet assembly in accordance with the teachings of the present invention.

FIG. 2 is a front sectional view of the assembled food holding assembly cabinet of FIG. 1.

FIG. 2(*a*) is an enlarged side sectional view of the compartment of the assembled food holding cabinet assembly designated in section a of FIG. 2.

FIG. 3 is a side sectional view of the assembled food holding cabinet assembly of FIG. 1.

FIG. 4 is a top view of a carrier insert to be placed in a drawer which is openable/closeable in a compartment of the assembled food holding cabinet assembly of FIG. 1.

FIG. 4(*a*) is an enlarged top view specifically illustrating the arrangement of open slits provided in the carrier insert of FIG. 4.

FIG. 5 is a side elevational view specifically illustrating placement of the carrier insert within a drawer of the food holding cabinet assembly in the side direction of arrow A of FIG. 4.

FIG. 6 is a front elevational view illustrating placement of the carrier insert into a drawer of the food holding cabinet assembly in the rear direction of arrow B of FIG. 1.

DETAILED DESCRIPTION OF CERTAIN PREFERRED EMBODIMENTS

Referring now to FIGS. 1 through 3 of the drawers, wherein like reference numerals represent like features in the several views, a food holding cabinet assembly 10 for holding pre-processed food products in accordance with the present invention is shown. As used herein, the phrase "pre-processed food products" shall mean food products which have been previously processed in some manner, such as cooked or toasted baked goods, including but not limited to toasted hamburger buns. This food holding cabinet assembly has been particularly designed for use in fast food restaurants, but can be utilized outside the fast food environment as well. As will be discussed in further detail below, this food holding cabinet assembly controls heat and humidity to advantageously maintain product appearance and certain desired attributes of the pre-processed food products. For instance, this food holding cabinet assembly 10 can be utilized to maintain the caramelized appearance and desired taste of toasted hamburger buns.

As shown in FIG. 1, the food holding cabinet assembly 10 of the present invention includes a steamer assembly 12 for generating steam from water in a water reservoir and a food cabinet housing 20 which is positioned with respect to the steamer assembly 12 such that the steam generated in the steamer assembly may be admitted into the food cabinet housing 20. In order to direct steam from the steam assembly 12 into the cabinet housing 20, a steam baffle assembly 16 is positioned between the steamer assembly 12 and the food cabinet 20. The steam baffle plate 16 and the food holding cabinet 20 can be coupled to the steamer assembly 12. In the food holding cabinet assembly 10 of this invention, the ability for decoupling or separating these components promotes cleaning of the interior of the steamer assembly 12. In this regard, as shown in FIGS. 2 and 3, a pair of coupling members 21a and 21b extending downwardly from the side edges 22a and 22b of the food cabinet housing slidably ride on a corresponding pair of rails 14a and 14b extending from the top of the side walls 15a and 15b of the steamer assembly 12. As a result, the food cabinet housing 20 is slidably movable between a first operative position, wherein the food cabinet housing 20 is mounted on the steamer assembly 12, and a second cleaning position, wherein the food cabinet housing 20 is moved off of the steamer assembly so that the interior portion 17 of the steamer assembly 12 is exposed for cleaning.

The steamer assembly 12 of this food holding cabinet assembly 10 may be dropped into an existing countertop or may stand alone. An example of a steamer assembly which may be used in conjunction with the food holding cabinet assembly 10 of this invention is described in U.S. Pat. No. 6,058,926, the disclosure of which is incorporated by reference herein.

In the steamer assembly 12 shown in FIGS. 1 and 2 herein, a water reservoir tray 30 is positioned directly beneath a elongated opening 32 of an air diversion pan 33 and longitudinally extends nearly the entire width of the steamer assembly 12 from the front wall 15b to the rear wall 15d thereof. Steam is generated by heating the water in the reservoir 30 to above its evaporation temperature. In one preferred embodiment, a strip heater 34 is positioned beneath the water reservoir 30 to heat and maintain the water in the water reservoir at a first substantially constant temperature above that necessary for evaporation. The operator sets the desired first constant temperature by means of a water heater thermostat (not shown). In the preferred embodiment, the first substantially constant temperature of the water in the water reservoir is maintained within the range of between approximately 130° to 180° F., and most preferably approximately 150° F.

In the food holding cabinet assembly 10 of the present invention, the steam generated in the water reservoir is funneled through the elongated opening 32 and directs the steam to pass through the interior space 36 thereof in the manner represented by arrows b in FIG. 2.

A second heat source 40 is employed for heating air passing through the cabinet housing 20 and maintaining the air passing through the cabinet housing 20 at a second substantially constant temperature. As but one example, this second heat source can be in the form of a tubular heating element 40 provided at the top of the air diversion pan 33 of the steamer assembly 12. However, it is contemplated that this second air heat source 40 may instead be positioned within the food cabinet housing 20. Nevertheless, the air heat source has a setting thermostat (not shown) which is separate and apart from and does not interact with the setting thermostat for the water heat source. In the preferred embodiment, the second substantially constant fixed temperature of the air passing through the food cabinet is maintained within the range of the approximately 125° to 150° F., and most preferably approximately 135° F. Because as noted above, the constant temperature of the water in the water reservoir 30 is preferably set within the range of between approximately 130° to 180° F., and most preferably approximately 150° F., the water in the water reservoir is set at a first substantially constant temperature and the air passing through the cabinet housing is set at a second substantially constant temperature, the relative humidity within the food cabinet 12 of the holding cabinet assembly 10 is thereby maintained at a substantially constant level. In the preferred embodiment, the relative humidity within the food cabinet 20 is maintained at approximately 70%.

As aforementioned, the air baffle plate 16 is positioned between the steamer assembly 12 and the cabinet housing 20. As shown in FIG. 1, the air baffle plate 16 includes a plurality of longitudinal rows of slit openings, such as 42a and b, and lateral rows of slit openings, such as 43a and b, through which air passes from the steamer assembly 12 into the cabinet housing 20. As will be discussed in more detail below, the rows of slit openings 42a and 42b substantially correspond to vertical air columns, such as 44a and 44b, provided in the cabinet housing 20 so as to predominantly direct air within the air columns 44a and 44b.

As shown in FIGS. 1 and 2, a plurality of compartments, such as 50a–f, are arranged in the cabinet housing 20 with each compartment including a corresponding openable and closeable drawer 52a–f slidably guided therein. In FIG. 1, the housing cabinet 20 includes 12 such compartments with only the front compartments 50a–f facing forward. However, the cabinet housing 20 may include any number of such compartments. As best shown in FIGS. 2a, a compartment drawer, such as 52a, includes guide members 54 and 54b extending from the sides thereof which ride in a pair of tracks 56a and 56b extending inwardly from the side edges of the respective compartment such that the drawer 52a slidably moves with respect to the compartment 50a between its open and closed conditions.

Air directed through the air baffle plate 16 passes predominantly into the central columns, such as 44a and b, of the cabinet housing 20. These central columns have air openings 45 aligned with each the compartments 50a–50f (see FIG. 3). In order to promote the circulation of air into the storage compartments 58, each drawer is provided with a plurality of air inlet openings 59 which are provided along the side surfaces 55a and 55b and bottom surface 55(c) of each drawer 52a–f. As a result, the air in the vertical columns 44(a) and 44(b) exits through the column air openings 45 to pass over the top of the drawers and through the air inlet openings 59 of each drawer.

As best shown in FIGS. 4–6, a carrier insert 60 is adapted to be removably supported in each of the drawers. Each of the carrier inserts is capable of holding a plurality of the pre-processed food products, such as 62a and 62b (see FIG. 5). When the pre-processed food products are removed from their processing station, such as a toaster, the food products can be placed in a leaning angled relationship to each other within the carrier insert 60. In the preferred embodiment, the rear supporting surface 65 of the carrier insert 60 is angled to the horizontal axis at an angle θ of approximately 41.5°. As a result, weight is removed from the bottom of the food products placed in the carrier inserts thereby distributing the weight of the food product therethroughout. Since the weight is so distributed, imprints are less likely to be formed on the food product due to the size and configuration thereof. Moreover, this angled rear supporting surface 65 also provides for operational ease because as each food product is removed from the carrier insert, the angled stack of remaining food products in the carrier insert does not fall.

After the food products are placed in the carrier inserts, the operator handles the filled carrier insert by means of handles 90a and b and places the carrier insert along the supporting surface 55c of the drawer such that outwardly extending side flanges 65a and 65b of the carrier insert are supported on extending side flanges 67a and 67b of the drawer. Each of the carrier inserts is capable of holding up to 7 hamburger buns of a 5" diameter and 10 hamburger buns of a 4" diameter. Thus, if the cabinet housing 20 includes twelve compartments as is shown in FIGS. 1 and 3, the food holding cabinet assembly 10 can accommodate 120 hamburger of a 4" diameter and 84 buns of a 5" diameter thereby lending to increased product capacity.

In order to promote drainage of moisture of the pre-processed food products supported in each of the carrier inserts as well as to promote distribution of air flow around the food products contained therein, the U-shaped supporting surface 70 of each carrier insert 60 includes a plurality of rows, such as 72a–d, of open slits 74. Preferably, each of the open slits 74 are ⅛" (see spacing c in FIG. 4a) by 2" (see spacing d in FIG. 4a). In order to further distribute air flow, the open slits 74 are arranged such that adjacent rows of the open slits, such as rows 72c and 72d, are substantially offset from one another, and alternate rows, such as rows 72a and 72b, are substantially aligned with each other. In the preferred embodiment, the spacing e between alternate rows of open slits is approximately ¾" with the spacing f between adjacent rows is approximately ⅜" (see FIG. 4a). Moreover, ends of adjacent open slits in adjacent rows, such as open slits 74c and 74d, overlap each other by an amount of approximately ¼".

As a result of the design of the cabinet housing 20 described above, each of the drawers 52a–f can be independently opened irrespective of the remaining closed drawers so that the pre-processed food products in the closed drawers are not influenced by external conditions. Therefore, if 12 drawers are employed in cabinet housing 20, only 1/12 of the food product is exposed to the external conditions at any given time.

Because of the compartmentalized design of the food cabinet housing assembly 10 which maintains substantially constant temperature and humidity within the food cabinet 20, the pre-processed food products are able to be held within the cabinet for up to approximately 90 minutes without the addition of any intermediate step, such as the repackaging step employed the prior art. Therefore, the present invention provides for labor reduction as a fast food restaurant worker does not, for instance, need to feed many hamburger buns into a toaster during peak hours.

The holding cabinet 20 of the food holding cabinet assembly 10 of this invention also includes a control indicating mechanism for controlling and sequencing the removal of the pre-processed food products from each compartment before the expiration of a predetermined time, that is, before the 90 minutes limit for food products in the cabinet housing expires. To achieve this object, each of the compartments includes a corresponding colored light indicator 80a–f controlled by a timer. Each light indicator signals by color differentiation the sequence of removal of the pre-processed food products from each of the compartments. These light indicators 80a–f employ a red-light, yellow-light, green-light coloring scheme to signal which compartment should have its food product removed first. If the light indicator is green, the food product in that food compartment should be used first. If the light indicator is yellow, newer product is contained in that compartment and food product in a compartment designated with a green light should be removed first. A flashing red light means the food product in that compartment has expired and a steady red light on the light indicators represents that no product is present in that compartment.

The food cabinet 20 of the food holding cabinet assembly 10 of this invention is also self-sanitizing. After all of the pre-processed food products have been removed from the compartments of the food cabinet, the cabinet is automatically run at a temperature up to preferably 200° F. for a predetermined period of time and then shuts off. In this manner, all of the compartments of the food cabinet can be sanitized at regular intervals. This self-sanitizing feature thus ensures food safety and reduces labor requirements.

This invention is also directed to a process for maintaining the product appearance of a pre-processed food products for predetermined time. In that process, water is heated in the water reservoir 30 by the water heater 34 and maintained at a constant temperature preferably within the range of 130° to 180° F., and most preferably 150° F. The food cabinet 20 is coupled to the steamer assembly so that the steam generated in the steamer assembly passes into the food cabinet housing. The second heat source 40 heats the air passing through the food cabinet to a second constant temperature and the air in the food cabinet housing 20 is maintained at that second constant temperature which is preferably within the range of 125° to 150° F., and more preferably, approximately 13520 F. As a result thereof, the process of the present invention maintains the relative humidity within the cabinet housing at a constant value, preferably 70%.

Each of the plurality of drawers 52a–f of the cabinet housing 20 is movably guided in one of the compartments 50a–f of the cabinet housing 20 so that each of the drawers can be independently opened/closed with respect to the other drawers. The pre-processed food products are removed from the processing station, such as a toaster, and placed in one of the plurality of carrier inserts 60. The carrier inserts are adapted to be removably supported within one of the drawers. When the drawers are closed into the respective compartments 50a–f of the cabinet housing 20, the pre-processed food products are conditioned at the constant relative humidity of the food cabinet for a predetermined about of time (such as the acceptable time limit for hamburger buns is 90 minutes) so as to maintain the product appearance and desired attributes of the pre-processed food products. One of the drawers can be independently opened so that the conditioned pre-processed food products can be removed therefrom prior to the expiration time. In addition, by means of the control indicator timers discussed above, the removal of the pre-processed food products from each of the compartments before the expiration time can be controlled and sequenced.

Therefore, in accordance with one of the general objects of the present invention, a food holding cabinet assembly for pre-processed food products has been provided which controls heat and humidity within the food product cabinet to maintain product appearance and desired attributes of the food products, such as the caramelized characteristics of a toasted hamburger bun. Further, the present invention also provides a food product holding cabinet assembly which is easy to use, of reduced costs, and results in increased holding times and product capacities. Moreover, the design of the individualized compartments, drawers and carrier inserts provides for thermal efficiencies and only exposes a small portion of the pre-processed food products to external conditions when a portion of the food products are removed from or inserted into the holding cabinet. In addition, the compartmentalized design has the ability to separate different types of food products, such as toasted 4" and 5" hamburger buns, for operational ease.

Although the invention has been particularly shown and described with reference to certain preferred embodiments, it will be readily appreciated by those of ordinary skill in the art that various changes and modifications may be made therein, without departing from the spirit and scope of the invention. It is intended that the claims be interpreted as including the foregoing as well as various other such changes and modifications.

What is claimed is:

1. A food holding cabinet assembly for holding pre-processed food products comprising:
   a steamer assembly capable of containing a water reservoir;
   first heater means for heating water in the water reservoir and maintaining the water in the water reservoir at a first substantially fixed temperature;
   a cabinet housing coupled to said steamer assembly and having air circulated therein;
   second heater means for heating air passing through the cabinet housing and maintaining the air in the cabinet housing at a second substantially fixed temperature so as to maintain a substantially fixed relative humidity within said cabinet housing;
   a plurality of compartments arranged in said housing with each compartment having an openable and closeable drawer; and
   a carrier insert adapted to be removably supported in each of said drawers, each said carrier insert capable of holding a plurality of said pre-processed food so that said pre-processed food products in said carrier inserts are conditioned at the substantially fixed relative humidity of said food cabinet housing so as to maintain the product appearance of the pre-processed food products.

2. The food holding cabinet assembly of claim 1 wherein said pre-processed food products are selected from the group consisting of cooked baked goods and toasted baked goods.

3. The food holding cabinet assembly of claim 1 wherein said pre-processed food products are toasted hamburgers buns.

4. The food holding cabinet assembly of claim 1 wherein the first fixed temperature of the water in said water reservoir is within the range of between approximately 130° to 180° F.

5. The food holding cabinet assembly of claim 1 wherein the first fixed temperature of the water in said water reservoir is approximately 150° F.

6. The holding cabinet assembly of claim 1 wherein the second fixed temperature of the air passing through said cabinet is within the range of between approximately 125° to 150° F.

7. The food holding cabinet assembly of claim 1 wherein the second fixed temperature of the air passing through said cabinet is approximately 135° F.

8. The food holding cabinet assembly of claim 1 wherein the relative humidity in the cabinet is fixed at approximately 70%.

9. The food holding cabinet assembly of claim 1 wherein first and second heater means are separately controlled.

10. The food holding cabinet assembly of claim 1 and further including control indicating means for indicating the relative freshness of the pre-processed food products in each of the plurality of compartments of the cabinet housing and for sequencing the selection of the pre-processed food products in each of the plurality of compartments of the cabinet housing.

11. The food holding cabinet assembly of claim 10 wherein said control indicating means including a product quality timer being placed adjacent to each compartment of said cabinet which has colored light indicators for sequencing the selection of the pre-processed food products in each of the plurality of compartments of the cabinet housing.

12. The food holding cabinet assembly of claim 1 wherein each of said carrier inserts can hold up to ten hamburger buns.

13. The food holding cabinet assembly of claim 1 wherein each of said carrier inserts includes drainage means for promoting drainage of moisture form the pre-processed food products held in each of said carrier inserts.

14. The food holding cabinet assembly of claim 13 wherein said drainage means includes a plurality of rows of open slits provided on a supporting surface of each of said carrier inserts.

15. The food holding cabinet assembly of claim 14 wherein adjacent rows of said plurality of rows of said open slits are substantially offset from one another.

16. The food holding cabinet assembly of claim 14 wherein alternate rows of said plurality of rows of said open slits are substantially aligned with one another.

17. The food holding cabinet assembly of claim 14 wherein each said open slit in the plurality of rows of open slits is approximately 2 inches long and one-eighth of an inch wide.

18. A food holding cabinet assembly for holding pre-processed food products comprising:
   a food holding cabinet including a plurality of compartments maintained at a fixed relative humidity with each compartment including an openable and closeable drawer; and
   a plurality of carrier inserts adapted to be removably supported in a corresponding one of said drawers, each said carrier insert capable of holding a plurality of said pre-processed food products whereby the pre-processed food products are subjected to said fixed relative humidity of said food holding cabinet so as to maintain the physical characteristics of the pre-processing for a predetermined amount of time; and
   wherein each of said drawers can be independently opened irrespective of the remaining drawers so that the pre-processed food products in the closed drawers are not exposed to exterior conditions.

19. A food holding cabinet assembly for holding pre-processed food products comprising:
   a food holding cabinet including a plurality of compartments maintained at a fixed relative humidity with each compartment including an openable and closeable drawer; and
   a plurality of carrier inserts adapted to be removably supported in a corresponding one of said drawers, each said carrier insert capable of holding a plurality of said pre-processed food products whereby the pre-processed food products are subjected to said fixed relative humidity of said food holding cabinet so as to maintain the physical characteristics of the pre-processing for a predetermined amount of time; and wherein each of said carrier inserts includes drainage and air flow means for promoting drainage of moisture from the pre-processed food products held in each said carrier insert and for promoting circulation of air flow around said pre-processed food products.

20. The food holding cabinet assembly of claim 19 wherein each of said drainage and air flow means includes a plurality of rows of open slits extending in a direction generally perpendicular to the direction of opening/closing of the drawer into and out of the food housing cabinet.

21. The food holding cabinet assembly of claim 20 wherein adjacent rows of said plurality of rows of open slits are substantially offset from one another.

22. The food holding cabinet assembly of claim 20 wherein alternate rows of said plurality of rows of open slits are substantially aligned with one another.

23. The food holding cabinet assembly of claim 20 wherein each of said open slit in the plurality of rows of open slits is approximately 2 inches long and one-eighth inch wide.

24. A food holding cabinet assembly for holding pre-processed food products comprising:

a food holding cabinet including a plurality of compartments maintained at a fixed relative humidity with each compartment including an openable and closeable drawer;

a plurality of carrier inserts adapted to be removably supported in a corresponding one of said drawers, each said carrier insert capable of holding a plurality of said pre-processed food products whereby the pre-processed food products are subjected to said fixed relative humidity of said food holding cabinet so as to maintain the physical characteristics of the pre-processing for a predetermined amount of time; and wherein each said carrier insert includes a back wall angled from horizontal at approximately 41.5° so that each pre-processed food product leans against the adjacent food product in said carrier insert so that the weight of each pre-processed food product is distributed.

25. A food holding cabinet assembly for holding pre-processed food products comprising:

a food holding cabinet including a plurality of compartments maintained at a fixed relative humidity with each compartment including an openable and closeable drawer; wherein each drawer includes air flow openings provided in a bottom wall and side walls connected to said bottom wall to promote air flow within said drawer; and a plurality of carrier inserts adapted to be removably supported in a corresponding one of said drawers, each said carrier insert capable of holding a plurality of said pre-processed food products whereby the pre-processed food products are subjected to said fixed relative humidity of said food holding cabinet so as to maintain the physical characteristics of the pre-processing for a predetermined amount of time.

26. A food holding cabinet assembly for holding pre-processed food products comprising:

a steamer assembly including a water reservoir which is maintained at a first substantially fixed temperature;

a cabinet housing mounted on said steamer assembly and having air circulated therein, said air in said cabinet housing being maintained at a second substantially fixed temperature so as to maintain a substantially fixed relative humidity within said cabinet housing;

coupling means for coupling said cabinet housing to said steamer assembly; and a plurality of compartments arranged in said housing with each compartment including a separately openable/closeable drawer with each said drawer capable of storing a plurality of pre-processed food products therein so that said pre-processed food products in said drawers are conditioned at the substantially fixed relative humidity of said cabinet housing so as to maintain the product appearance of said pre-processed food products.

27. The food holding cabinet assembly of claim 26 wherein said coupling means includes a pair of rails provided on top of said steamer assembly on which a corresponding pair of coupling members of said food cabinet housing slidable ride so that said food cabinet housing is slidably movable between a first operative position, wherein said food cabinet housing is mounted on said steamer assembly, and a second cleaning position, wherein said food cabinet housing is moved off said steamer assembly so that an interior portion of said steamer assembly is exposed for cleaning.

28. The food holding cabinet assembly of claim 27 wherein a steam baffle plate separates said steamer assembly and said food holding cabinet.

* * * * *